(12) United States Patent
Wiaterek

(10) Patent No.: US 6,890,467 B2
(45) Date of Patent: May 10, 2005

(54) METHOD FOR PRODUCING A BRAKE SHOE

(75) Inventor: Christian Wiaterek, Odenthal (DE)

(73) Assignee: TMD Friction GmbH, Leverkusen (DE)

( * ) Notice: Subject to any disclaimer, the term of this patent is extended or adjusted under 35 U.S.C. 154(b) by 360 days.

(21) Appl. No.: 10/111,171

(22) PCT Filed: Aug. 10, 2001

(86) PCT No.: PCT/EP01/09249

§ 371 (c)(1),
(2), (4) Date: Apr. 22, 2002

(87) PCT Pub. No.: WO02/16795

PCT Pub. Date: Feb. 28, 2002

(65) Prior Publication Data

US 2002/0153212 A1 Oct. 24, 2002

(30) Foreign Application Priority Data

Aug. 23, 2000 (DE) .......................................... 100 41 308

(51) Int. Cl.[7] .............................................. B29C 59/02
(52) U.S. Cl. ...................... 264/250; 264/265; 264/264; 264/247; 264/251; 264/345; 264/296; 264/320
(58) Field of Search ................................. 264/251, 265, 264/267, 247, 250, 345, 296, 320, 253

(56) References Cited

U.S. PATENT DOCUMENTS 4,273,219 A * 6/1981 Ito ............................. 188/256
5,474,159 A * 12/1995 Soennecken et al. ... 188/251 A

FOREIGN PATENT DOCUMENTS

DE 4127113 A1 * 2/1993
JP 08277866 A * 10/1996

* cited by examiner

Primary Examiner—Edmund H. Lee
(74) Attorney, Agent, or Firm—Diller, Ramik & Wight

(57) ABSTRACT

In a method for producing a brake shoe (1), particularly a brake shoe for disk brakes in motor vehicles, by preforming a friction lining (6), arranged on a carrier plate (2), from a friction material fed into a press mould and by press-molding the friction material under pressure and heat to form a friction lining (6), it is provided that grooves (8) are formed in the friction lining (6) which are open at least towards the front face of the friction lining, that the friction lining (6) provided with grooves (8) is exposed to a scorching process, that, subsequent to the scorching process, an elastic filling agent (12) is inserted into the grooves (8), and that, subsequent to the insertion of the filling agent (12), the brake shoe (1) is subjected to a drying process, a hardening process or a cross-linking process depending on the filling agent (12) used.

11 Claims, 2 Drawing Sheets

METHOD FOR PRODUCING A BRAKE SHOE

BACKGROUND OF THE INVENTION

The instant invention relates to a method for producing a brake shoe.

In a known method for producing a brake shoe, particularly a brake shoe for disk brakes in motor vehicles, a friction lining arranged on a carrier plate is preformed from a friction material fed into a mould, and is press-molded under heat to thus form a friction lining tightly connected to the carrier plate. In this regard, it is also known to arrange an intermediate layer between the friction lining and the carrier plate, the intermediate layer having a vibration-dampening effect and being also effective to bond the friction lining to the carrier plate.

It is further known to produce friction linings formed with grooves arranged in a specific pattern and extending downward at least to the depth of the intermediate layer. A disadvantage of this production method resides in that the resultant friction lining, which is segmented by the grooves, will only have a poor strength and that, at least in case of high mechanical stresses acting on the brake shoe, it cannot be excluded that parts of the friction lining may shift out of position.

SUMMARY OF THE INVENTION

It is an object of the invention to provide a method for producing a brake shoe which allows for the production of a friction lining which is segmented by grooves while having improved mechanical strength properties.

According to the invention, it is advantageously provided that grooves are formed in the friction lining which are open at least towards the front face of the friction lining, that the friction lining provided with the grooves is exposed to a scorching process, that, subsequent to the scorching process, an elastic filling agent is inserted into the grooves, and that, subsequent to the insertion of the filling agent, the brake shoe is subjected to a drying process, a hardening process or a cross-linking process depending on the filling agent used.

The filling agent, which does not consist of friction material, will connect the lining portions arranged between the grooves, so that the overall strength of the friction lining is increased while a high elasticity is maintained. According to the instant method, it is advantageously provided that, subsequent to the forming of the grooves into the friction lining, the friction lining is first subjected to a scorching process and that only thereafter a filling agent will be filled into the grooves.

The friction lining can be pressed into one unit together with an intermediate layer arranged between the friction lining and the carrier plate.

Preferably, it is provided that, during the press-molding of the friction lining under pressure and heat, the grooves are produced by means of a pressing tool adapted to the desired groove pattern.

Alternatively, it can be provided that the friction lining is first produced without the grooves by means of a press-molding process, and that the grooves will be formed in the friction lining, e.g. by machining, prior to the scorching process.

The grooves can be formed to pass continuously through the friction lining in an orientation facing away from the carrier plate in such a manner that they will be open towards the friction surface and towards the lateral edges. During the insertion and drying of the filling agent, the lateral exit openings of the grooves on the friction lining edges of the friction lining will be held closed by use of a mould or cover until the filling agent has reached a solid state.

Alternatively, the grooves can be produced to have a discharge passage leading into the friction lining front face so that the grooves are open only towards the friction lining front face. This advantageously obviates the need for devices for closing the lateral outlet openings during the filling and hardening of the filling agent.

After the press-molding and prior to the scorching process, the friction lining can be first hardened and then be ground.

Alternatively, after the press-molding and prior to the scorching process, the friction lining can be first ground and then hardened.

The grooves can be filled with filling material up to the friction lining front face or, by way of alternative, they can be filled only partially.

Embodiments of the invention will be explained in greater detail hereunder with reference to the drawings.

DESCRIPTION OF THE PREFERRED EMBODIMENTS

Figure 1:
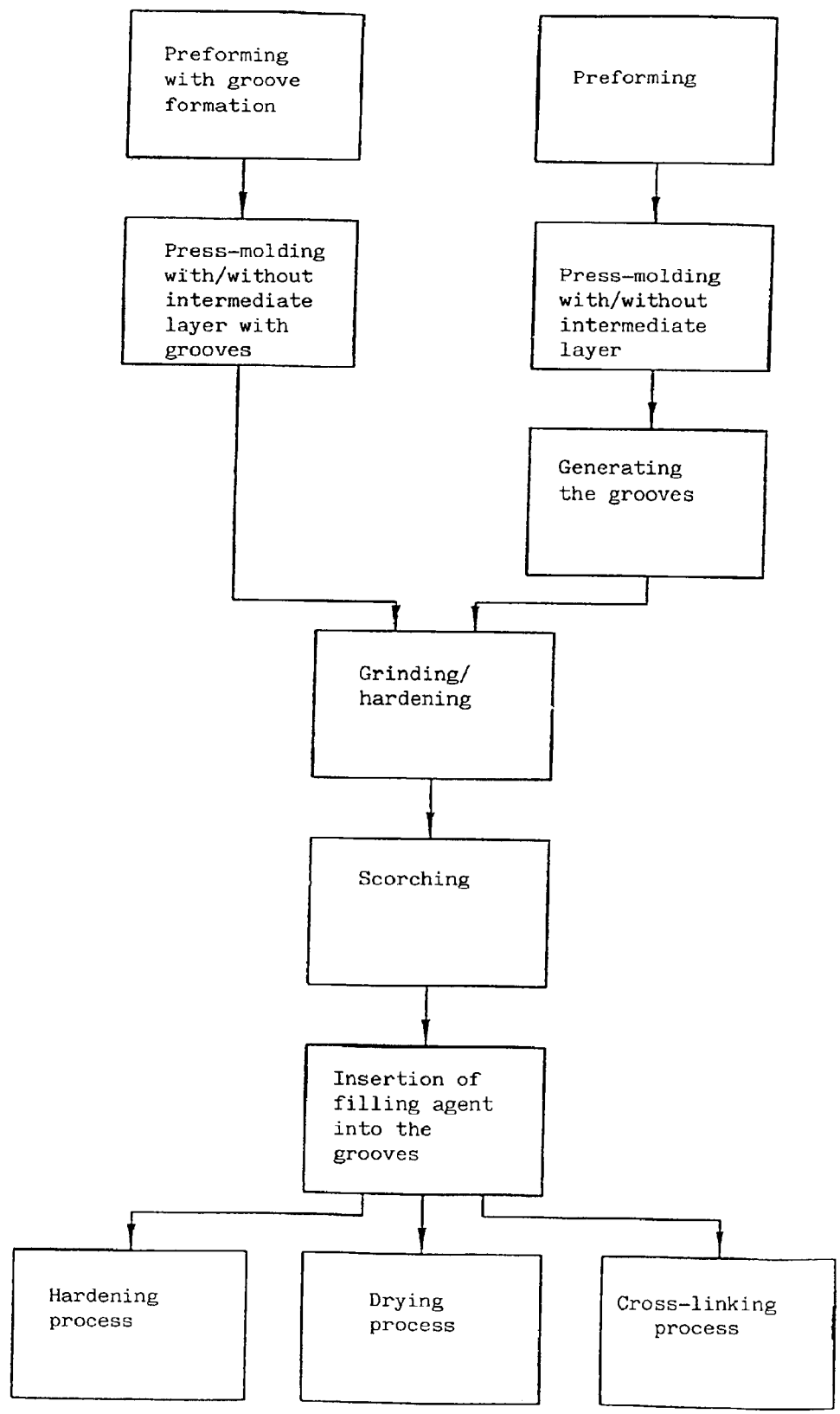
FIG. 1 is a flow diagram of the production method.

FIG. 1 indicates the sequential course of a process for producing a brake shoe wherein a friction lining material is first preformed and then is molded in a mould under heat and pressure to assume its final shape.

The friction material can be preformed as indicated in the left portion of the flow chart and, in a press-molding step performed under heat and pressure by means of press tool adapted to the provided groove pattern, the friction material can be pressed into its final shape having grooves provided therein.

Alternatively, the friction material can be preformed and the friction lining can be finally pressed by press-molding without generating grooves, while the grooves will be worked into the friction lining at a later time, e.g. by machining.

In both cases, the friction lining can be connected to the carrier plate with or without an intermediate layer.

Subsequently, the friction lining provided with the grooves is first ground and then hardened or first hardened and then ground.

If the grooves are to be formed at a later time, the formation of the grooves can be performed also after the grinding or hardening.

The thus produced brake shoe 1 comprising the friction lining 6 with the grooves formed therein is then subjected to a scorching process.

After the scorching process, the filling agent 12 is introduced into the grooves 8 in pasty form. Various materials can be used as filling agents 12.

For instance, the filling agent 12 can comprise an unmodified or modified liquid resin which is hardened by polyaddition, polycondensation or radical polymerization.

Alternatively, the filling agent 12 can comprise a liquid caoutchouc in latex phase, a pasty rubber mixture or silicone.

Also useful as a filling agent is novolak which is permanently introduced into a solvent. The solvent can be dried by a suitable temperature, while novolak can be hardened at a temperature up to 200° C.

All of the above mentioned filling materials 12 can be provided with abrasive substances/grinding particles to enhance the friction effect, and/or with organic or inorganic fibers for mechanical stabilization. The inorganic fibers can be synthetic mineral fibers, e.g. rock wool, and/or metallic fibers, e.g. steel, copper, brass, bronze fibers in the form of wool or chips.

Depending on the filling agent 12 used, the brake shoe 1 will then be subjected to a process step in which the filling agent 12 is hardened, dried or cross-linked.

Figure 2:
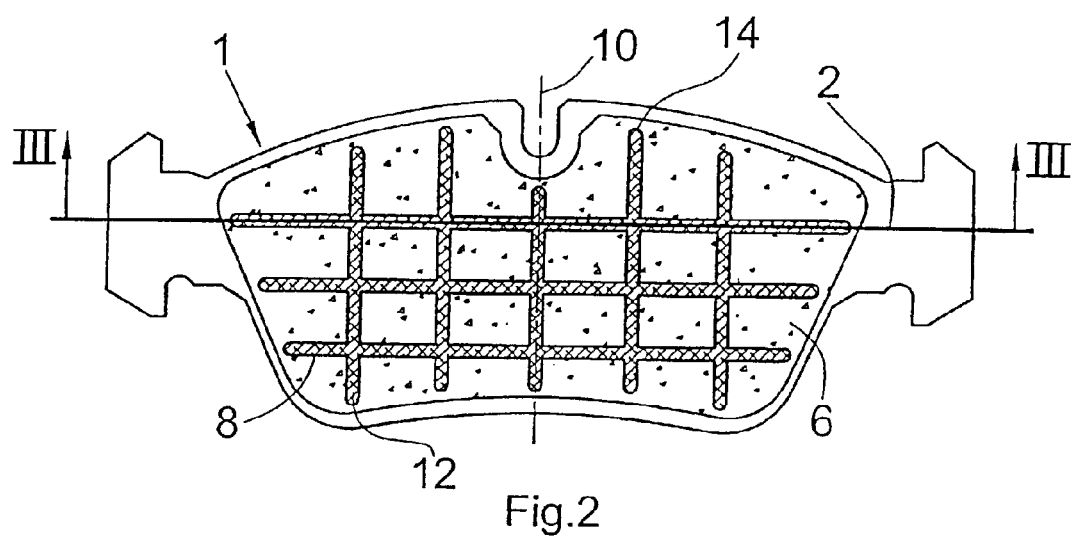
FIG. 2 is a view of a brake shoe produced according to the invention.

The brake shoe 1 for a disk brake in motor vehicles as shown in FIG. 2 comprises a carrier plate 2 having bonded thereto a friction lining 6 formed with open grooves 8 which are facing away from the carrier plate 2 and are arranged in a groove pattern, with the grooves 8 extending on the one hand in parallel to the axis of symmetry 10 of the brake shoe 1 and on the other hand orthogonally thereto, thus forming a groove grid dividing the friction lining 6 into a plurality of lining segments.

The grooves 8 are filled by a filling agent 12 elastically connecting the lining segments to each other; the filling agent tightly adheres to the wall regions of the lining segments; thus, on the one hand, the filing agent will increase the strength of the friction lining 6 segmented into lining sections and on the other hand will lend elasticity to the friction lining 6.

Figure 3:
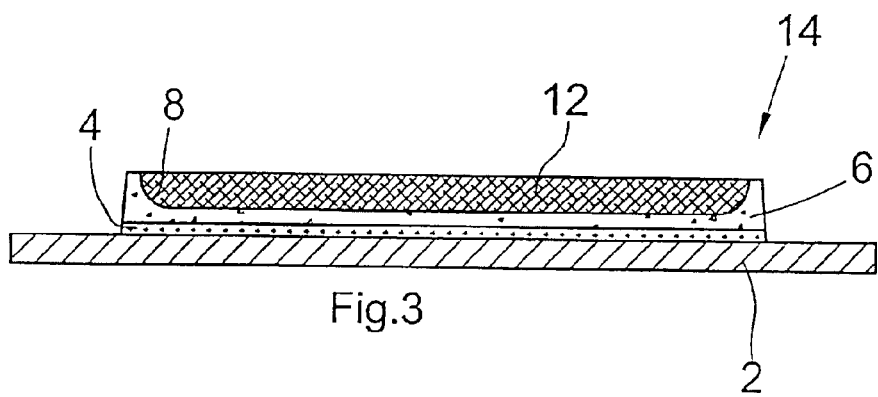
FIG. 3 is a sectional view along the line III—III in FIG. 2.

In the embodiment illustrated in FIG. 3, the grooves 8 are not formed with a depth reaching down to the intermediate layer 4 or the carrier plate 2. It can also be provided that the grooves 8 are only partially filled with filling agent 12.

Although a preferred embodiment of the invention has been specifically illustrated and described herein, it is to be understood that minor variations may be made in the apparatus without departing from the spirit and scope of the invention, as defined by the appended claims.

What is claimed is:

1. A method of producing a brake shoe (1) comprising the steps of press molding friction material under heat and pressure to form a friction lining (6), uniting the friction lining (6) to a carrier plate (2) forming grooves (8) in the friction lining (6) which open through a friction braking surface thereof remote from the carrier plate (2), after forming the grooves (8) subjecting at least the grooves (8) of the grooved braking surface to a scorching process, subsequent to the scorching process inserting a filling agent (12) into the grooves, and subsequent to the insertion of the filling agent (12) into the grooves subjecting the brake shoe (1) to one of a drying process, a hardening process and a cross-linking process depending upon the filling agent (12) characteristics.

2. The method according to claim 1, characterized in that the friction lining (6) is pressed into one unit together with an intermediate layer (4) arranged between the friction lining (6) and the carrier plate (2).

3. The method according to claim 1, characterized in that, during the press-molding of the friction lining (6) under pressure and heat, the grooves (8) are produced by means of a pressing tool adapted to the provided groove pattern.

4. The method according to claim 1, characterized in that the friction lining (6) is first produced without grooves (8) through press-molding, and that the grooves (8) are formed in the friction lining (6) prior to the scorching process.

5. The method according to claim 1, characterized in that the grooves (8) are formed to pass continuously through the friction lining (6) and that, during the insertion and drying of the filling agent (12), the lateral exit openings of the grooves (8) on the friction lining edges of the friction lining (6) are held closed by means of a mould or cover.

6. The method according to claim 1, characterized in that the grooves (8) are produced to have a discharge passage (14) leading into the friction lining front face so that the grooves (8) are open only towards the friction lining front face.

7. The method according to claim 1, characterized in that, after the press-molding and prior to the scorching process, the friction lining (6) is first hardened and then ground.

8. The method according to claim 1, characterized in that, after the press-molding and prior to the scorching process, the friction lining (6) is first ground and then hardened.

9. The method according to claim 1, characterized in that the grooves (8) are only partially filled with the filling material (12).

10. The method according to claim 1, characterized in that, during the press-molding of the friction lining (6) under pressure and heat, the grooves (8) are produced by means of a pressing tool adapted to the provided groove pattern.

11. The method according to claim 1, characterized in that the friction lining (6) is first produced without grooves (8) through press-molding, and that the grooves (8) are formed in the friction lining (6) prior to the scorching process.

* * * * *